B. WOODS.
JAR STEAMER.
APPLICATION FILED MAR. 17, 1917.
1,256,416.
Patented Feb. 12, 1918.
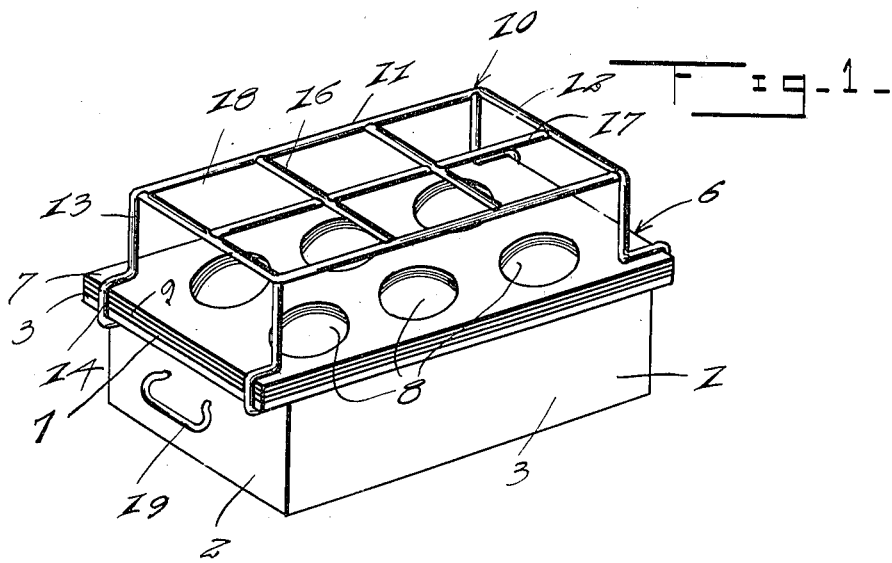
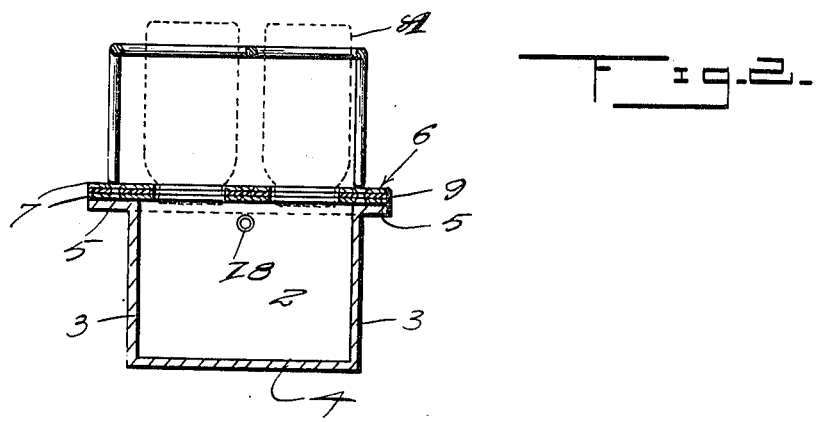
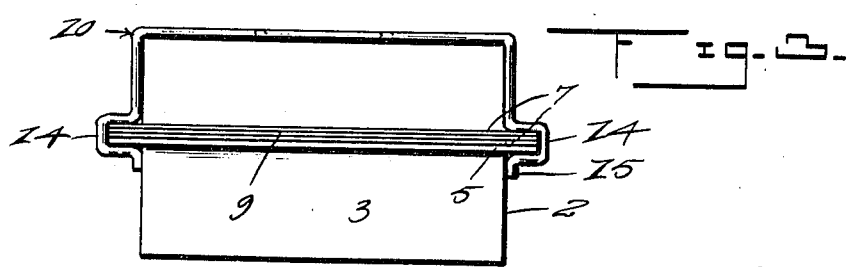
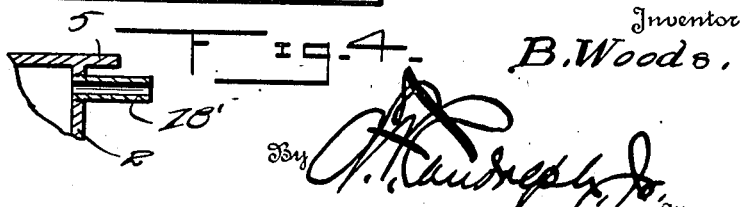
Inventor
B. Woods.

UNITED STATES PATENT OFFICE.

BERTHA WOODS, OF PLATTEVILLE, WISCONSIN.

JAR-STEAMER.

1,256,416.   Specification of Letters Patent.   Patented Feb. 12, 1918.

Application filed March 17, 1917. Serial No. 155,552.

*To all whom it may concern:*

Be it known that I, BERTHA WOODS, a citizen of the United States, residing at Platteville, in the county of Grant and State of Wisconsin, have invented certain new and useful Improvements in Jar-Steamers; and I do hereby declare the following to be a full, clear, and exact description of the invention, such as will enable others skilled in the art to which it appertains to make and use the same.

This invention relates to improvements in jar steamers.

The object of this invention is to provide a device especially adapted for heating jars prior to placing heated materials in the jars thus avoiding the breakage or injury to the jars caused by the placing of heated materials therein.

A further object of this invention is to improve the construction of jar steamers, whereby a plurality of jars may be held in an inverted position over an open end of a receptacle thus permitting the jars to be heated to a required temperature and the jars easily removed from the device when desired.

A still further object of this invention is to improve the construction of jar steamers and to provide a receptacle or container upon which is arranged a perforated plate in which the open ends of the jar are positioned and secured to the plate and receptacle is a supporting rack which is adapted to engage the bodies of the jars for holding the jars in an inverted position over the receptacle to permit them to be heated to the desired temperature.

A still further object of this invention is the provision of a device of this character, which will be simple, practical and comparatively inexpensive in construction and one that can be manufactured and sold at a low cost.

With these and other objects in view, the invention consists of the novel combination and arrangements of parts hereinafter more fully described and set forth in the claim hereto appended.

In the drawing:

Figure 1 is a perspective view illustrating a jar steamer as made in accordance with this invention, Fig. 2 is a transverse sectional view of the same, Fig. 3 is a side elevation of the steamer, and, Fig. 4 is a fragmentary sectional view illustrating a steam outlet.

Like numerals of reference designate corresponding parts in all the figures of the drawing.

Referring to the drawings, the numeral 1 indicates a rectangular container or receptacle constructed of metal suitable for the purpose and it consists in its construction of end walls 2, side walls 3, and a bottom wall 4. The upper edges of the end walls and side walls are bent outwardly to provide horizontal supporting flanges 5. The receptacle or container 1 is adapted to be positioned upon a stove, furnace or other heating source, and adapted to contain water which may be heated to a boiling temperature, the purpose of which will be hereinafter more fully described.

A perforated tray 6 comprises in its construction a pair of rectangular plates 7, which plates are provided with alined openings 8 which are adapted to receive the reduced neck portions of jars therein when inverted and ready to be heated.

The plates 7 have arranged between their opposing faces, an asbestos lining 9, which lining is provided with openings alining with the openings 8 in each of the plates 7, thereby providing a supporting tray which is adapted to be removably secured upon the upper side of the flanges 5 formed on the container or receptacle 1. and locating the openings formed in the plates over the open end of the receptacle or container 1.

A jar supporting rack designated in its entirety by the numeral 10, is constructed of wire and consists of a rectangular frame having side bars 11 and end bars 12, and depending from each corner of the frame are vertical supporting legs 13. The legs have their lower terminals bent laterally to provide U-shaped clamping members 14, and one arm of the U-shaped clamping members is bent downwardly as at 15 to engage the end walls 2 of the container 1 to support the rack rigidly thereon. The side bars 11 have connected to their opposing sides transversely arranged spacing bars 16, which have connected centrally therein, the longitudinally extending spacing bars 17, and the bars 16 and 17 define rectangular spaces 18, which are in direct alinement and in superposed relation with the openings 8 in the tray 6. It will be apparent that in use the jars are placed inverted and arranged in the spaces 18 until their neck portions are fitted into the openings 8, the body thereby supporting the jars in an inverted position upon the tray and the rack will hold the jars against shifting laterally or becoming accidentally displaced during the heating of the interior of the jars.

One end wall 2 of the container 1 has removably fitted therein a spout 18′, which spout may be closed by a suitable type of plug or may be left open to control the amount of steam within the receptacle or container 1.

A pair of handles 19 are secured to the opposite end walls 2 to facilitate the carrying of the container 1.

In use, the container or receptacle 1 is placed upon a stove or other heating source partly filled with water. The tray 6 is then arranged upon flanges 5 and located over the open end of the container or receptacle 1. The rack is then snapped in position, as illustrated in Fig. 1, and this is accomplished by sliding the flanges 5 between the U-shaped members 14 secured to the legs of the rack to securely support the tray in a rigid manner upon the flanges 5 of the container 1.

It will be readily seen that by virtue of this construction of jar steamer, that the jars may be readily inverted in position upon the tray and within the rack and steam rising from the water in the receptacle or container 1 may enter into the jars thus heating them to the required temperature and obviate fear or liability of the breakage of the jars when placing hot materials therein during the canning or preserving process.

What is claimed is:

An apparatus of the class described comprising a metal container having end walls, side walls and a bottom wall, the upper edges of the side and end walls being bent outwardly in a substantially horizontal plane forming supporting flanges, a metal tray including spaced plates having disposed between their opposing faces asbestos sheets, the asbestos sheets and plates being perforated for the reception of jars, said tray adapted to be removably arranged on the horizontal supporting flanges of the container, and a wire rack comprising a rectangular frame, supporting legs depending from said frame, U-shaped clamping members formed on the terminals of the legs for removably securing the rack and tray to the container.

In testimony whereof I affix my signature in presence of two witnesses.

BERTHA WOODS.

Witnesses:
GEO. H. METCALF,
Mrs. B. L. NEWMAN.